United States Patent
Colon

(10) Patent No.: US 12,012,068 B2
(45) Date of Patent: Jun. 18, 2024

(54) METHOD AND SYSTEM FOR ACTIVATING ACCESS TO A VEHICLE PARKED IN AN AREA NOT COVERED BY A DATA NETWORK

(71) Applicant: VULOG, Nice (FR)

(72) Inventor: François Colon, Marseilles (FR)

(73) Assignee: VULOG, Nice (FR)

( * ) Notice: Subject to any disclaimer, the term of this patent is extended or adjusted under 35 U.S.C. 154(b) by 69 days.

(21) Appl. No.: 17/790,217

(22) PCT Filed: Dec. 29, 2020

(86) PCT No.: PCT/EP2020/087978
§ 371 (c)(1),
(2) Date: Jun. 30, 2022

(87) PCT Pub. No.: WO2021/136779
PCT Pub. Date: Jul. 8, 2021

(65) Prior Publication Data
US 2023/0068045 A1  Mar. 2, 2023

(30) Foreign Application Priority Data
Dec. 30, 2019 (FR) ...................... 1915716

(51) Int. Cl.
*B60R 25/24* (2013.01)
*H04W 4/40* (2018.01)
*H04W 4/80* (2018.01)

(52) U.S. Cl.
CPC ............. *B60R 25/24* (2013.01); *H04W 4/40* (2018.02); *H04W 4/80* (2018.02); *B60R 2325/103* (2013.01)

(58) Field of Classification Search
CPC .... B60R 25/24; B60R 2325/103; H04W 4/40; H04W 4/80; H04W 4/46; G06Q 30/0645; G07C 5/0808; G06K 7/10366
See application file for complete search history.

(56) References Cited

U.S. PATENT DOCUMENTS

2006/0055564 A1* 3/2006 Olsen .................. B60R 25/1004
235/375
2009/0015373 A1* 1/2009 Kelly ...................... B60R 25/24
340/5.62

(Continued)

FOREIGN PATENT DOCUMENTS

FR  3076651 A1  7/2019

OTHER PUBLICATIONS

International Search Report (with English Translation) and Written Opinion (with Machine Translation) dated Apr. 22, 2021 in corresponding International Patent Application No. PCT/EP2020/087978; 18 pages.

*Primary Examiner* — Vernal U Brown
(74) *Attorney, Agent, or Firm* — Maier & Maier, PLLC

(57) ABSTRACT

A method for activating access to a vehicle within a vehicle fleet parked in a parking area not covered by a data network. An activation signal is sent from a user's computer equipment via a short-range wireless connection. The activation signal is received by embedded computer equipment of a plurality of fleet vehicles. A computerized logic process leads to an election of at least one of the vehicles. The process is based on an analysis of the fuel level and/or the electrical charging level of the fleet vehicles, or on an analysis of the intensity with which the activation signal has been received. The elected vehicle is identified by transmitting its location and/or identification data, which transmission is done via a short-range wireless connection in the parking area. An access authorization to the elected vehicle (Continued)

is transmitted from the user equipment, which transmission is done via a short-range wireless connection.

11 Claims, 7 Drawing Sheets

(56) References Cited

U.S. PATENT DOCUMENTS

| | | |
|---|---|---|
| 2011/0112969 A1 | 5/2011 | Zaid et al. |
| 2015/0137943 A1 | 5/2015 | Nagel et al. |
| 2016/0093216 A1 | 3/2016 | Lee et al. |
| 2017/0076515 A1* | 3/2017 | Nyalamadugu .... G06K 7/10366 |

* cited by examiner

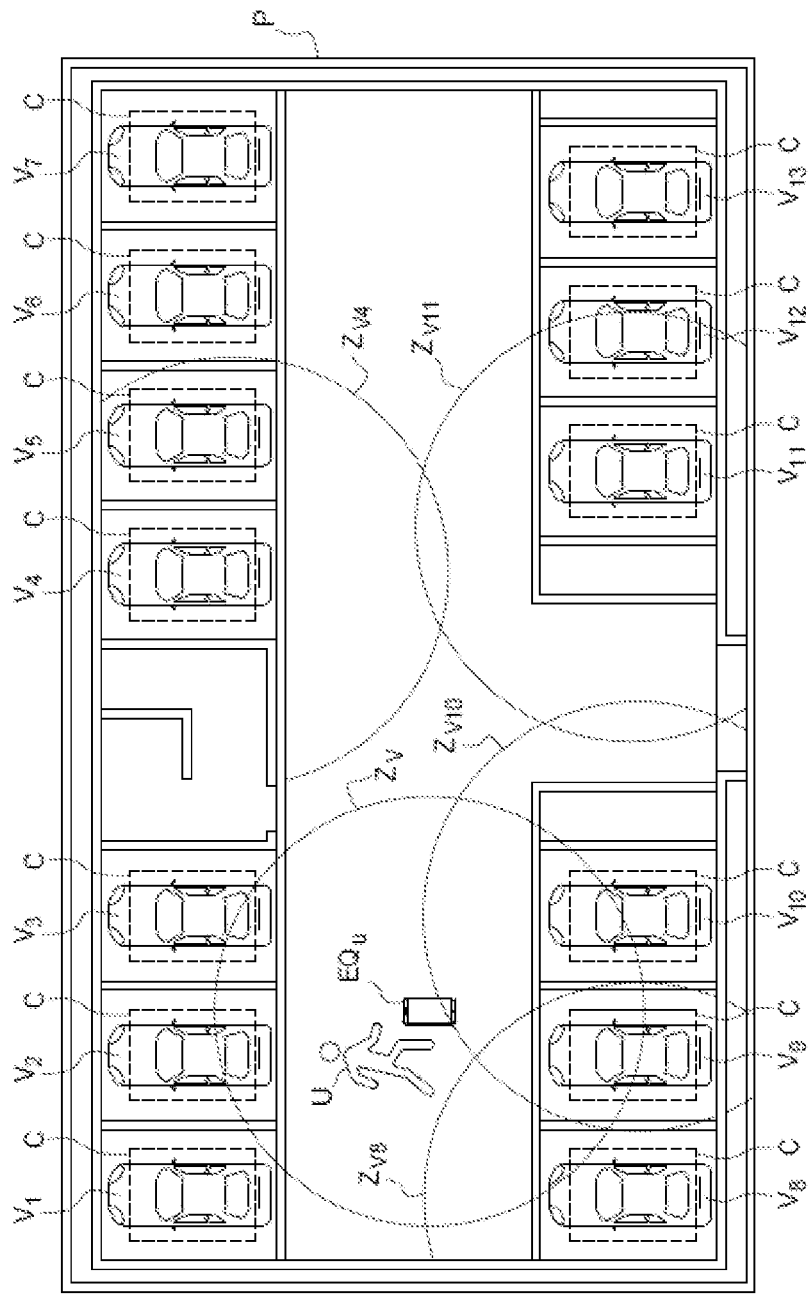
[Fig. 1]

[Fig. 2]
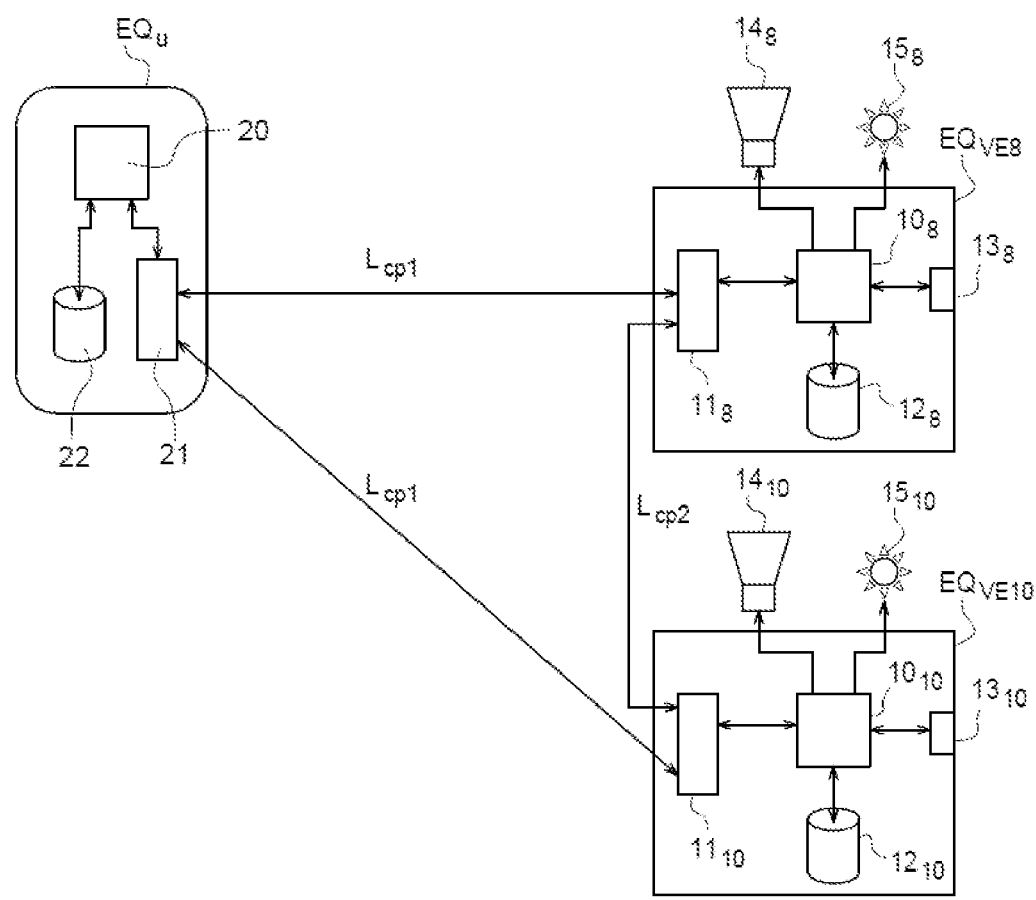

[Fig. 3a]
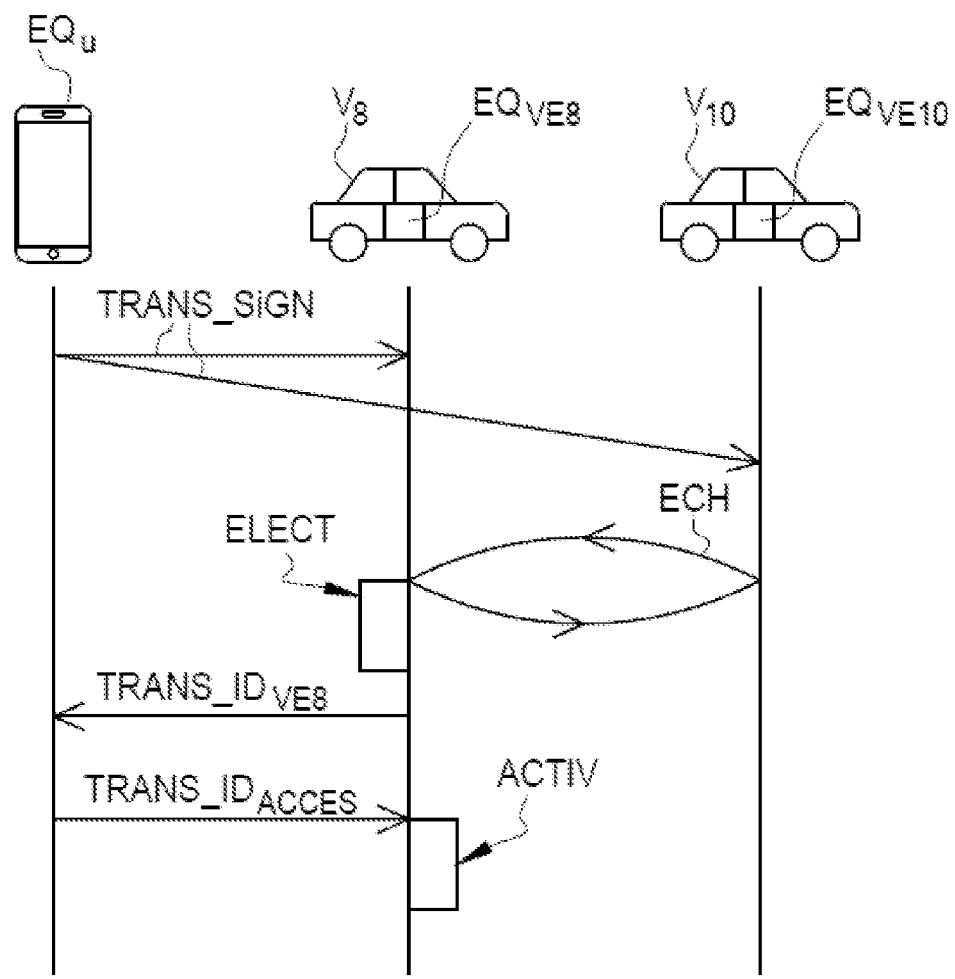

[Fig. 3b]
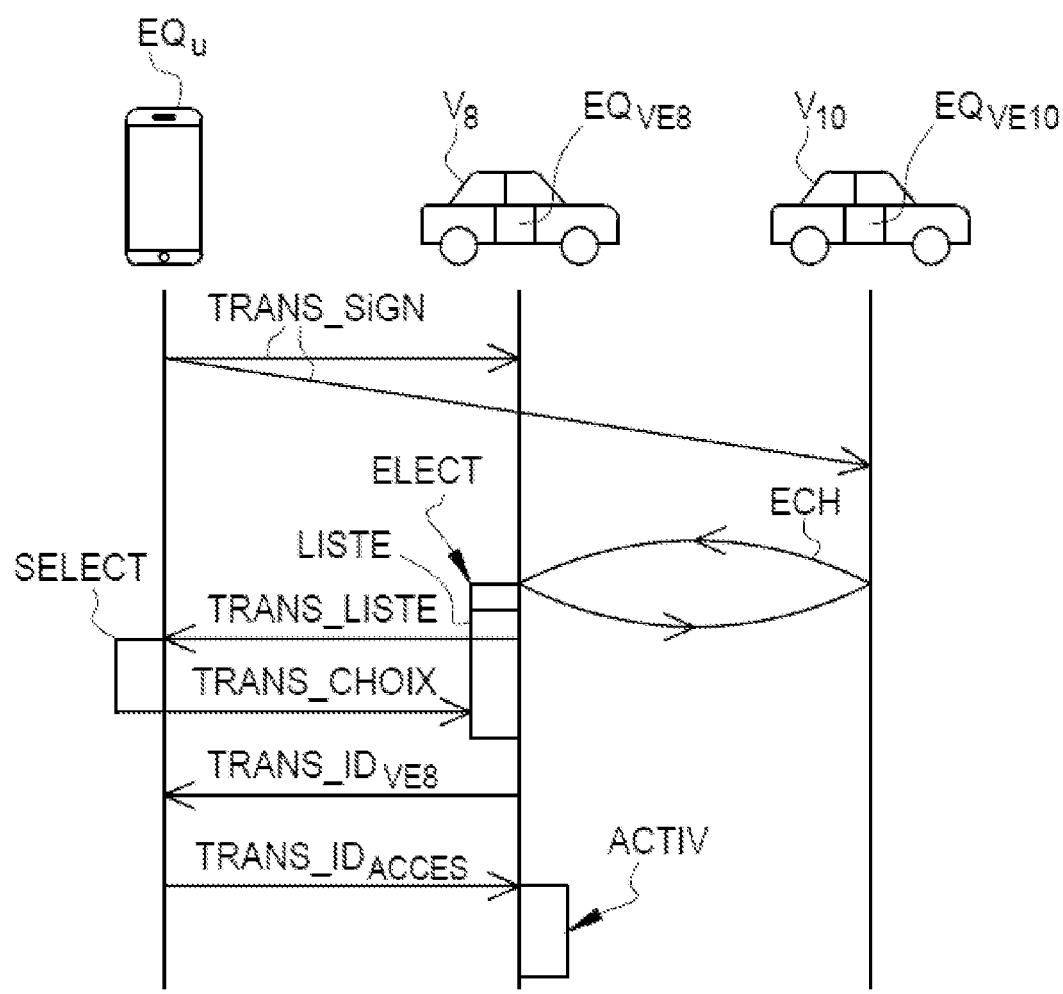

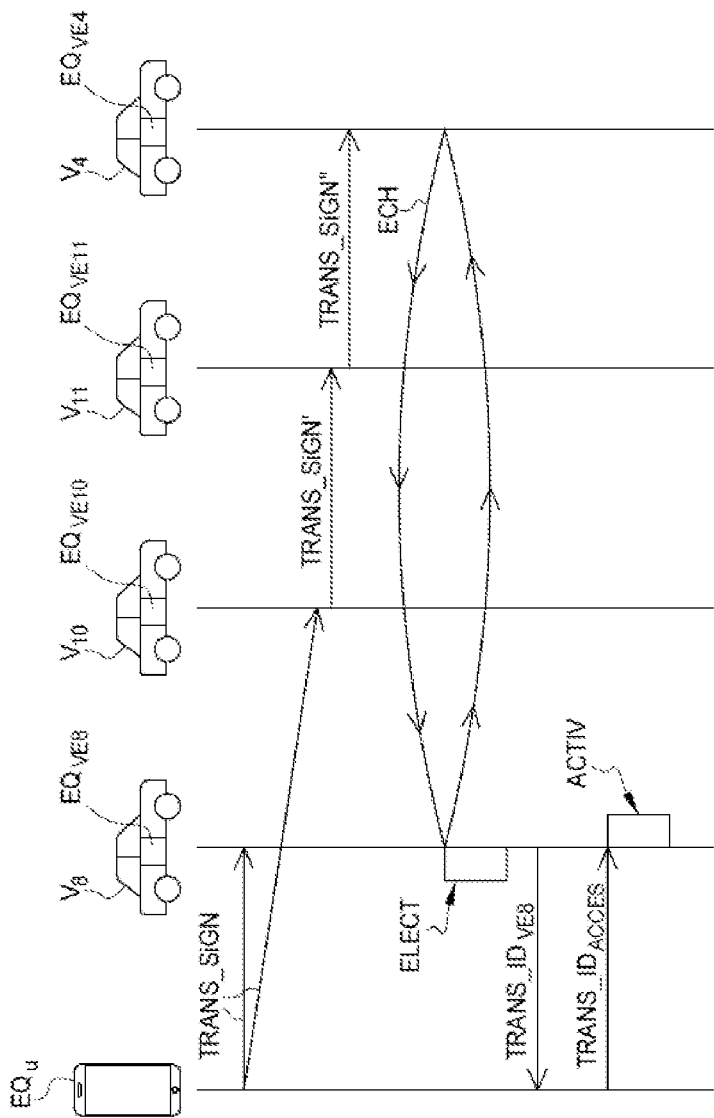
[Fig. 4a]

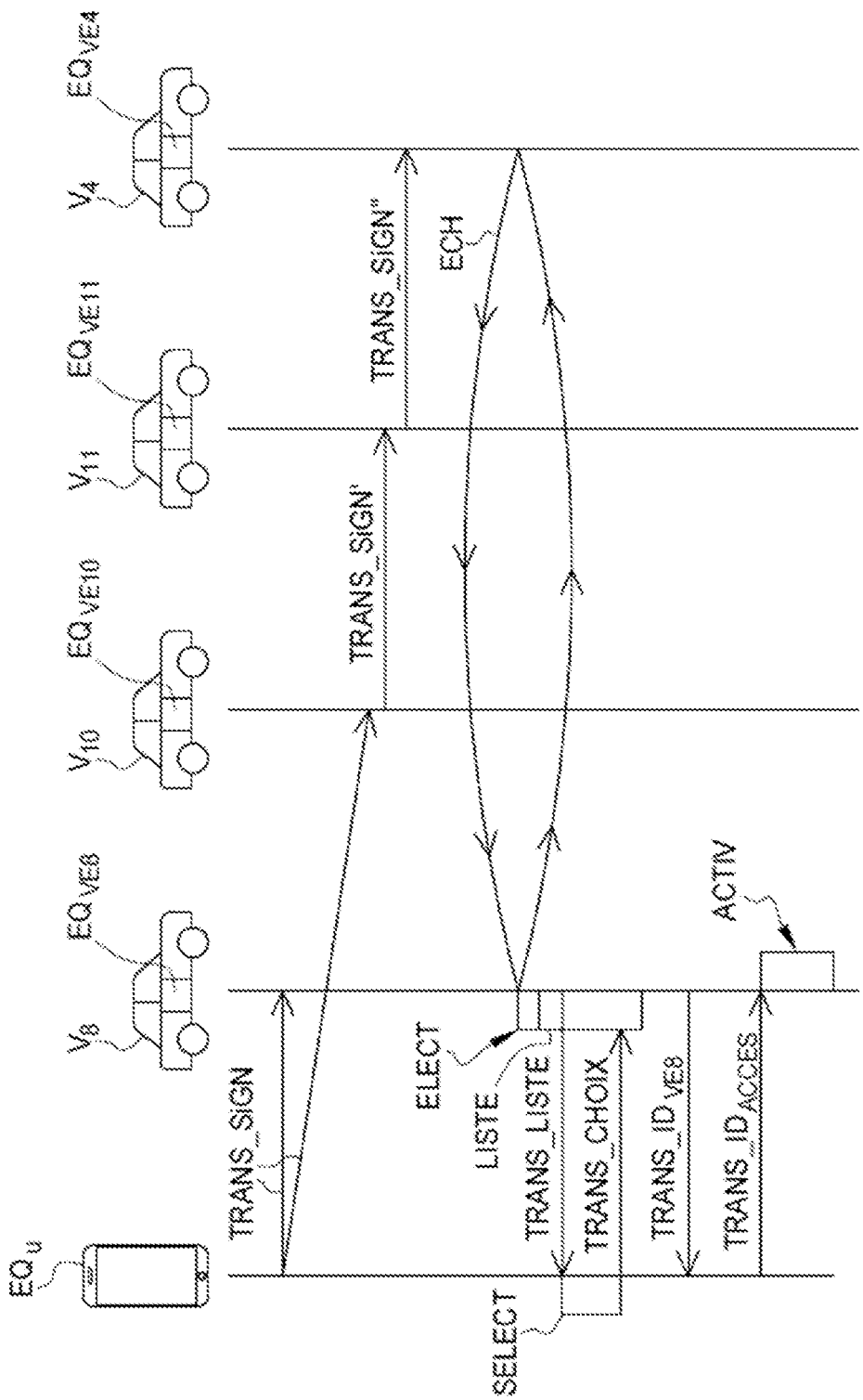
[Fig. 4b]

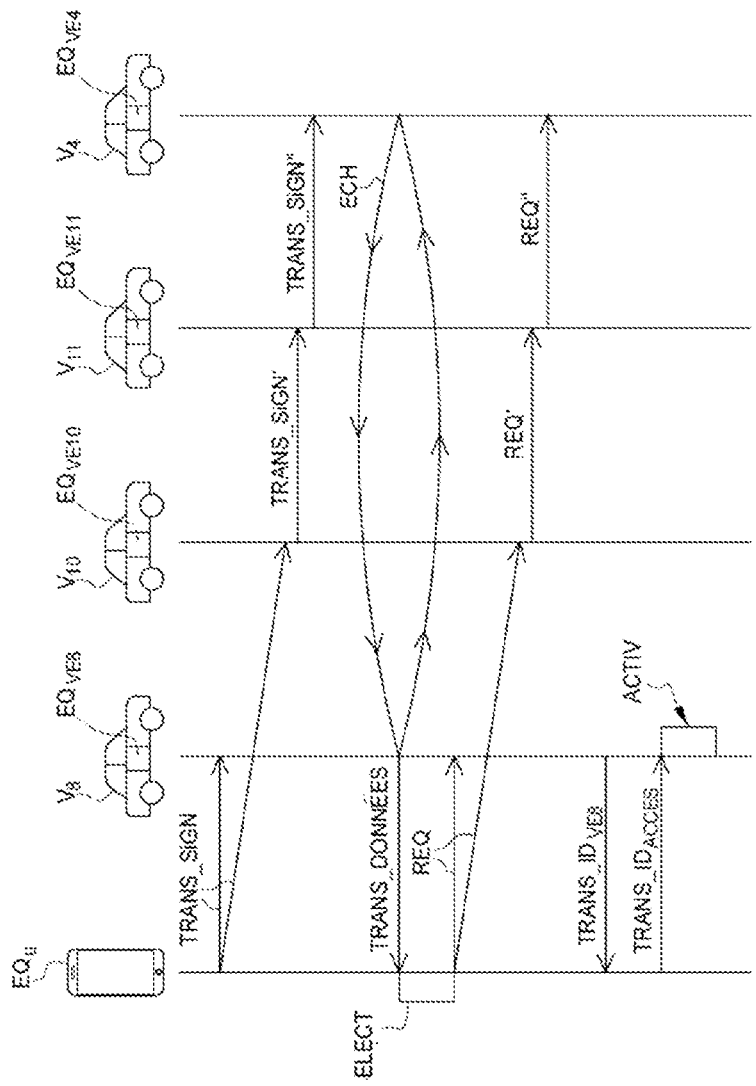

METHOD AND SYSTEM FOR ACTIVATING ACCESS TO A VEHICLE PARKED IN AN AREA NOT COVERED BY A DATA NETWORK

TECHNICAL FIELD

The invention relates to a method and a system for activating access to a vehicle parked in an area not covered by a data network.

The field of the invention relates, in particular, to the transmission of wireless signals between user equipment and equipment embedded in vehicles, and more specifically, to the transmission of signals making it possible to control said vehicles (in particular, opening and/or taking control of them).

BACKGROUND

Solutions are known which make it possible to reserve and activate the opening of the vehicle by means of user equipment. For example, documents US2015/0137943 and US2016/093216 describe such solutions where an activation signal is only received by one single vehicle.

Current systems generally work in the same way: a user's smartphone connects to a centralised server. This comprises a database, wherein the last known positions of the available vehicles are stored. By interrogating this database, the smartphone user can select an available vehicle and reserve it. This reservation information is transmitted to the server, via a data network, for example, a 4G network. The server always transmits the reservation information through the network to a computer device embedded in the vehicle. The user moves near the vehicle and requires access authorisation from the server. The latter can transmit the access authorisation either directly to the vehicle's embedded equipment or to the smartphone, in any case, the transmission is made through the network.

Yet, there is a problem when the vehicle is parked in an area not covered by a data network. Neither the smartphone, nor the vehicle's embedded equipment can exchange data with the server. This can happen in underground car parks or closed garages.

Document FR3076651 describes a solution making it possible to transmit access authorisation to the vehicle's embedded equipment, while the vehicle is off-network. The server transmits the access authorisation to the smartphone beforehand. The smartphone and the embedded equipment can then exchange access authorisation by means of a short-range wireless connection of the Bluetooth type.

However, this solution may have certain shortcomings. Indeed, the server cannot precisely locate the vehicle, insofar as it is off-network (its geolocation data not being able to be communicated to the server). The server possibly knows its last known position, generally the entrance to the car park or garage, but not its precise final position. The server will be able to inform the user that a vehicle is available in a particular car park or garage, but without being able to indicate to them the precise parking space, or even the floor. The user will therefore have to search for the vehicle themselves from among a plurality of vehicles. This search can prove to be extremely complex and time-consuming if the vehicle is parked in a large vehicle fleet and/or if the car park or garage is large, with several floors.

An aim of the invention is to overcome the above-mentioned disadvantages. Another aim of the invention is to provide a method for efficiently making it possible to assist the user such that they easily access a parked vehicle from a plurality of off-network vehicles.

SUMMARY

The solution proposed by the invention is a method for activating access to a vehicle within a vehicle fleet parked in a parking area not covered by a data network, comprising the following steps:

transmission of an activation signal from a user's computer equipment, which transmission is done via a short-range wireless connection in the parking area, reception of the activation signal by embedded computer equipment of a plurality of vehicles of the vehicle fleet, implementation of a computerised logic process leading to the election of at least one vehicle from among the plurality of vehicles, which the process is based on:

on an analysis of the available fuel level and/or the electrical charging level of the vehicles of the plurality of vehicles, or on an analysis of the intensity with which the embedded computer equipment has received the activation signal, identification of the elected vehicle:

by transmitting, from the elected vehicle, location information of said vehicle, and/or by transmitting one or more pieces of identification data of the elected vehicle to the user equipment, from the embedded equipment of one of the plurality of vehicles, which transmission is done via a short-range wireless connection in the parking area, transmission of an access authorisation to the elected vehicle's embedded equipment from the user equipment, which transmission is done via a short-range wireless connection in the parking area, activation of access to the elected vehicle following reception of the access authorisation by the embedded equipment of said vehicle.

A dialogue now takes place between the user and the plurality of vehicles. Contrary to the solution described in document FR3076651, it is no longer the server which transmits the vehicle ID to the user beforehand, but it is the vehicle itself which signals directly to the user. The activation signal will be received by a several vehicles located in the proximity of the user (due to the short-range wireless connection), this reception triggering a process making it possible to elect a vehicle from among this plurality of vehicles. Also, it is this elected vehicle which will itself signal to the user by transmitting a means of identification to them. The time required to search for the vehicle will therefore be considerably reduced with respect to the known solutions of the prior art.

Other advantageous characteristics of the invention are listed below. Each of these characteristics can be considered individually or in combination with the noteworthy characteristics defined above, and form the subject, if necessary, of one or more divisional patent applications:

According to an embodiment, the location information consists of an audible and/or visual signal transmitted by the elected vehicle.

According to an embodiment, the location information consists of information about the location of the elected vehicle in the parking area.

According to an embodiment, the method comprises the following steps: —reception of the activation signal by the computer equipment of a first vehicle of the plurality of vehicles; —transmission of the activation signal from the computer equipment of the first vehicle, to at least the computer equipment of a second vehicle of the plurality of vehicles; —transmission of the activation signal from the computer equipment of the second vehicle to at least the computer equipment of a third vehicle of the plurality of vehicles; and wherein the transmission of the signal between the first vehicle, the second vehicle and the third vehicle is done via a short-range wireless connection in the parking area.

According to an embodiment, the method comprises a step consisting of arranging the embedded equipment in the form of a wireless mesh network.

According to an embodiment, the computerised election logic process comprises the following steps: —developing a selectable list wherein the vehicles from the plurality of vehicles are ranked in descending order of fuel and/or charge level, each vehicle from the list being associated with a unique ID; —transmitting the list to the user equipment from the embedded equipment of a vehicle from the plurality of vehicles, which transmission is done via a short-range wireless connection in the parking area; selection, from the user equipment, of a vehicle from among the vehicles from the list; —transmitting the unique ID of the selected vehicle, to the embedded equipment of a vehicle from the plurality of vehicles, from the user equipment, which transmission is done via a short-range wireless connection in the parking area; —completing the selection process by electing the selected vehicle.

According to an embodiment, the method comprises the following steps: storing, in a memory of each embedded equipment of the vehicles from the plurality of vehicles, a list of user IDs and/or user equipment IDs associated with unwanted users; —integrating, in the access authorisation, a user ID and/or a user equipment ID; —to activate access to the elected vehicle, prior verification, by the embedded equipment of said vehicle, that the user ID and/or the user equipment ID are not stored in said list.

According to an embodiment, the method comprises a step consisting of integrating an ID in the activation signal, which ID is adapted to trigger the computerised election logic process.

According to an embodiment, the short-range wireless connection uses a communication protocol from the following family: Bluetooth, Wi-Fi, Z-Wave, ANT, ZIGBEE, Infrared.

Another aspect of the invention relates to a system comprising at least one piece of equipment of one user, and at least one piece of embedded computer equipment of a vehicle, for implementing the steps of the method according to one of the preceding characteristics.

Also, another aspect of the invention relates to a computer program product comprising code instructions for executing a method according to one of the preceding characteristics, when it is executed by at least one piece of embedded computer equipment of a vehicle.

BRIEF DESCRIPTION OF FIGURES

Other advantages and characteristics of the invention will become clearer in the description of a preferred embodiment below, with reference to the appended drawings, produced by way of non-limitative examples for guidance, wherein:

FIG. 1 illustrates a use case of the invention when several vehicles of a fleet are likely to be reserved and are parked in an area not covered by a data network, FIG. 2 schematises the arrangement of different elements of user equipment and of several pieces of computer equipment embedded in vehicles.

FIG. 3a is an example of carrying out the steps of a method according to the invention, according to a first embodiment, FIG. 3b is an example of carrying out the steps of a method according to the invention, according to the first embodiment in an alternative embodiment, FIG. 4a is an example of carrying out the steps of a method according to the invention, according to a second embodiment, FIG. 4b is an example of carrying out the steps of a method according to the invention, according to the second embodiment in an alternative embodiment, FIG. 5 is an example of carrying out the steps of a method according to the invention, according to a third embodiment.

DETAILED DESCRIPTION OF THE EMBODIMENTS

The method and system of the invention cause manipulations of physical elements, in particular signals (electrical or magnetic) and digital data, capable of being stored, transferred, combined, compared, etc., and making it possible to achieve a desired result.

The invention implements one or more computer applications executed by computer equipment or servers. For clarity, it must be understood in the scope of the invention, that "a piece of equipment or server does something" means "the computer application executed by a processing unit of the equipment or server does something". Just as "the computer application does something" means "the computer application executed by the processing unit of the equipment or server does something".

Also, for clarity, the present invention makes reference to one or more "computerised logic processes". The latter correspond to the actions or results obtained by the execution of instructions of different computer applications. Also, it must be understood in the scope of the invention, that "a computerised logic process is adapted to do something" means "the instructions of a computer application executed by a processing unit do something".

Also, for clarity, the following clarifications are made to certain terms used in the description and the claims:

"Computer resource" can be understood in a non-limiting way as: component, hardware, software, file, connection to a computer network, amount of RAM memory, hard disk space, bandwidth, processor speed, number of CPUs, etc.

"Computer server" can be understood in a non-limiting way as: computer device (hardware or software) with computer resources to perform the functions of a server and which offers services, computer, plurality of computers, virtual online server, virtual Cloud server, virtual platform server, virtual local infrastructure server, server networks, cluster, node, server farm, node farm, etc.

"Request" means an execution order which could follow a communication protocol and comprising input parameters (question, information, etc.) and possibly return parameters (answer, information, etc.), which could be presented in a format linked to the protocol used.

"Processing unit" can be understood in a non-limiting manner, as: processor, microprocessors, CPU (Central Processing Unit), etc.

"Computer application" can be understood as: software, computer program, computer microprogram, executable lines of code, software, etc.

"Data network" can be understood in a non-limiting manner, as: internet network, cellular network, satellite network, etc. It is a set of computer equipment connected together to exchange, securely or not, information and/or data according to a communication protocol (ISDN, Ethernet, ATM, IP, CLNP, TCP, HTTP, etc.).

"Database" can be understood in a non-limiting manner, as a structured and organised set of data stored on media accessible by computer equipment and which could be interrogated, read and updated. Data can be inserted, recovered, modified and/or destroyed. Management and access to the database can be ensured by a set of computer applications which constitute a database management system (DBMS).

"Service" can be understood in a non-limiting manner, as the set of functionalities proposed and ensured by a server and/or by at least one piece of computer equipment. The service can comprise, for example, the following functionalities: reservation of a vehicle, location of a vehicle, locking/unlocking of a vehicle, etc. The service comprises, in particular, activating access to a vehicle while it is outside of the data network.

"Shared vehicle" can be understood in a non-limiting manner, as a rental vehicle or a car sharing is a vehicle made available to "customers" or members. The vehicle can be: an autonomous car (capable of driving on the road without the intervention of a driver), a car or a lorry (internal combustion engine and/or electric engine), a motorised two-wheeler (internal combustion engine and/or electric engine), a bicycle (conventional or electrically-assisted), a scooter (conventional or electrically-assisted), a skateboard, an electric unicycle, a Segway, a boat, etc. When a user uses a shared vehicle, they can be charged a certain amount, generally depending on the number of kilometres travelled and/or the time the vehicle is used and/or the model or type of vehicle.

Such as used here, unless otherwise specified, the use of the ordinal adjectives "first", "second", etc., to describe an object simply indicates that different occurrences of similar objects are mentioned, and does not imply that the objects thus described must be in a given sequence, whether in time, space, ranking or otherwise.

FIG. 1 illustrates vehicles $V_1$-$V_3$ parked in an area not covered by a data network, for example an underground car park P or a garage. Some or all of these vehicles are shared vehicles to which a user U wishes to have access. As an illustrative example, the vehicles $V_4$, $V_8$, $V_{10}$ and $V_{11}$ are the shared vehicles to which the user U can have access (hereinafter, "target vehicles"). The other vehicles are, for example, private vehicles which are not accessible to the user U. The set of vehicles $V_1$-$V_{13}$ is here named "vehicle fleet". When entering the car park P, the user U does not know which target vehicles they can access, these vehicles could generally not be distinguished from other vehicles of the fleet.

Referring to FIG. 2, each target vehicle integrates embedded computer equipment $EQ_{VE8}$, $EQVE_{10}$. This equipment can, for example, form part of a telematic box enabling the vehicle to exchange information (e.g. geographical position, speed, etc.) with the remote server presented in the introductory part of the present description, through a data network. The computer equipment $EQ_{VE8}$, $EQVE_{10}$ can also be dedicated equipment, independent of the telematic box.

Each embedded equipment $EQ_{VE8}$, $EQVE_{10}$ comprises, among other computer resources, a processing unit $10_8$, $10_{10}$, a signal transmitter/receiver $11_8$, $11_{10}$ and one or more memories $12_8$, $12_{10}$ wherein a computer application is stored. These different elements are connected to at least the processing unit $10_8$, $10_{10}$ by a communication bus.

The instructions of the computer application stored in the memory $12_8$, $12_{10}$, when they are executed by the processing unit $10_8$, $10_{10}$, make it possible to carry out the steps of the method which are described above in the description. The memory $12_8$, $12_{10}$ is also adapted to store a certain number of pieces of information, which information is presented above in the description.

The transmitter/receiver $11_8$, $11_{10}$ is adapted to exchange signals, via a short-range wireless connection $L_{CP1}$ with the user equipment $EQ_U$ described above in the description and/or with the embedded equipment of the other target vehicles, via a short-range wireless connection $L_{CP2}$. The connections $L_{CP1}$ and $L_{CP2}$ have, for example, a range lower than or equal to 100 metres, even less than or equal to 20 metres.

The signals exchanged are preferably infrared or radiofrequency signals. The connections $L_{CP1}$ and $L_{CP2}$ preferably use a communication protocol from the following family: Bluetooth, Wi-Fi, Z-Wave, ANT, ZIGBEE, Infrared. The connections $L_{CP1}$ and $L_{CP2}$ can use the same communication protocol or separate protocols.

The user U has at least one piece of computer equipment $EQ_U$ which comprises a communication interface, for example, GSM, 3G, 4G or Wi-Fi, to establish a wireless communication connection with the remote server presented above, through a data network. The user equipment $EQ_U$ is preferably a smartphone, a digital tablet, a laptop, etc.

In FIG. 2, the user equipment $EQ_U$ integrates a processing unit 20, a signal transmitter/receiver 21 and one or more memories 22 wherein a computer application for implementing the service ("service application") is stored. These different elements are connected to at least the processing unit 20 by a communication bus. It also comprises the computer resources making it possible to carry out the steps of the method of the invention. Transmitter/receiver 21 is similar to that of the embedded equipment $EQ_{VE8}$, $EQ_{VE10}$.

According to an embodiment, to download the service application and have access rights to the service, the user U must register beforehand with a rights management server which may or may not be the above-mentioned remote server. According to an embodiment, the registration of the user U is performed with a web service of the remote server associated with the service. The registration comprises the registration of a user ID and/or a user equipment ID $EQ_U$. This can be a port, an IP address, a MAC address or any other address or combination making it possible to identify a piece of user equipment $EQ_U$. According to an embodiment, the user U is pre-registered from a piece of software and is known by the fact that an ID is stored in a database of the above-mentioned remote server.

In FIG. 1, the transmitting/receiving zone of the user equipment $EQ_U$ is referenced $Z_U$. The transmitting/receiving areas of the embedded equipment of the target vehicles $V_4$, $V_8$, $V_{10}$ and $V_{11}$ are respectively referenced as $Z_{V4}$, $Z_{V8}$, $Z_{V10}$ and $Z_{V11}$. These transmitting/receiving zones depend partially on the power of the transmitters/receivers $11_8$, $11_{10}$ and 21. The zone $Z_U$ partially overlaps with $Z_{V8}$ and $Z_{V10}$. The zones $Z_{V4}$ and $Z_{V11}$ are not overlapped by the zone $Z_U$. It results that only the embedded equipment $EQ_{VE8}$ and $EQ_{VE10}$ of the target vehicles $V_8$ and $V_{10}$ will be able to directly communicate and exchange data with the user equipment $EQ_U$. The zones $Z_{V8}$ and $Z_{V10}$ also overlap one another, such that the target vehicles $V_8$ and $V_{10}$ can also directly communicate and exchange data with each other by means of their embedded equipment $EQ_{VE8}$, $EQ_{VE10}$ via the short-range wireless connection $L_{CP2}$ (FIG. 2).

First Embodiment

FIG. 3a illustrates the steps of a first embodiment of the method according to the invention, in the use case of FIG. 1 (user and off-network vehicles, in the car park P). In this embodiment, the user equipment $EQ_U$ communicates only with the embedded equipment of which the transmitting/receiving zone overlaps the zone $Z_U$, i.e. the equipment $EQ_{VE8}$ and $EQ_{VE10}$ of the target vehicles $V_8$ and $V_{10}$.

The user U launches the service application on their $EQ_U$ and sends an activation signal from said equipment. This step is referenced TRANS_SIGN. This activation signal is sent to the car park P, via the connection $L_{CP1}$ (FIG. 2), by using a Bluetooth-type protocol.

The activation signal preferably contains an ID adapted for triggering the computerised election logic process described above in the description. This ID is, for example, a signature specific to the service application or another similar data making it possible to indicate that the activation signal has been sent by a user (or user equipment) with access rights to the service (authorised user). This ID makes it possible to ensure that the computerised election logic process is only triggered by an authorised user and not by another unauthorised user who has triggered the transmission of any Bluetooth signal.

The activation signal is here only received by the embedded equipment $EQ_{VE8}$ and $EQ_{VE10}$ of the target vehicles $V_8$ and $V_{10}$. Upon receiving the activation signal, the equipment $EQ_{VE8}$ and $EQ_{VE10}$ will participate in the implementation of a computerised logic process leading to the election of one of these two vehicles.

In the case where the signal contains an ID, the embedded equipment $EQ_{VE8}$ and $EQ_{VE10}$ will analyse it to verify that the signal is actually from an authorised user. This verification can be done, for example, by comparing the received ID with an ID stored in the memory $12_8$, $12_{10}$. The election process ELECT is then triggered only after this verification step.

According to an embodiment, the election process ELECT is based on an analysis of the fuel level (in the case of an internal combustion engine) and/or the electrical charge level (in the case of an electric engine) of the vehicles $V_8$ and $V_{10}$. The elected vehicle will be the one with the highest fuel level or charge level. Referring to FIG. 3a, during an information exchange step ECH, the embedded equipment $EQ_{VE8}$, $EQ_{VE10}$ will exchange their respective fuel or charge level. Each embedded equipment $EQ_{VE8}$, $EQ_{VE10}$ will, for example, interrogate a gauge sensor installed in a vehicle fuel tank or a charge sensor connected to a battery system of a vehicle electric engine.

For example, both the vehicles $V_8$ and $V_{10}$ have electric (respectively combustion) engines and it is the target vehicle $V_8$ which has the highest charge (respectively fuel) level. The election process ELECT is thus completed by electing the target vehicle $V_8$.

According to another example, the vehicle $V_8$ comprises an internal combustion engine and the vehicle $V_{10}$ comprises an electric engine. The fuel level in the vehicle $V_8$ makes it possible to drive for longer than the charge level allows in the vehicle $V_{10}$. The election process ELECT is thus completed here by electing the target vehicle $V_8$.

According to another embodiment, the election process ELECT consists of determining the intensity with which the embedded equipment $EQ_{VE8}$ and $EQ_{VE10}$ have received the activation signal. The elected vehicle will be that which has received the activation signal with the highest intensity. This vehicle is generally that which is physically closest to the user U. During the information exchange step ECH, the embedded equipment $EQ_{VE8}$, $EQ_{VE10}$ of the vehicles $V_8$ and $V_{10}$ will exchange the intensity level with which they have respectively received the activation signal. As an example, it is the embedded equipment $EQ_{VE8}$ which receives the activation signal with the highest intensity, such that the target vehicle $V_8$ is elected.

The election process ELECT can be implemented in the embedded equipment $EQ_{VE8}$, or in the embedded equipment $EQ_{VE10}$, or simultaneously in both these pieces of equipment. One of the two pieces of embedded equipment can be considered as a master piece of equipment ensuring the implementation of the election process. The other piece of equipment is then considered as a slave piece of equipment communicating only information (fuel or charge level, activation signal strength, etc.) to the master equipment. According to an embodiment, the master equipment is that receiving the activation signal first (e.g. the equipment $EQ_{VE10}$). According to another embodiment, the master equipment is that receiving the activation signal with the highest intensity (e.g. the equipment $EQ_{VE8}$).

Following its election, the elected vehicle $V_8$ identifies itself to the user U. According to an embodiment, this identification step comprises the transmission of one or more identification data $ID_{VE8}$ of the elected vehicle $V_8$, to the user equipment $EQ_U$ (step TRANS_$ID_{VE8}$). This transmission can be done from the equipment $EQ_{VE8}$ of the elected vehicle $V_8$, or from the master equipment (which can be the equipment $EQ_{VE8}$ or the equipment $EQ_{VE10}$). This transmission is done via the connection $L_{CP1}$ (FIG. 2), in the car park P. A transmission via another short-range wireless connection using another, more secure, communication protocol can however be considered.

The identification data $ID_{VE8}$ of the elected vehicle $V_8$ is advantageously presented in the form of its number plate code (numeric or alphanumeric), to which is preferably added an indication of its model and its colour and/or its image or photo. This information makes it possible for the user to very simply and very quickly identify the elected vehicle $V_8$ from among all the other vehicles $V_1$-$V_{13}$.

According to another embodiment which is combined with or which substitutes the transmission TRANS_$ID_{VE8}$ of the identification data $ID_{VE8}$, the step of identifying the elected vehicle $V_8$ comprises the transmission, from said elected vehicle, of location information of said vehicle. This location information advantageously consists of an audible and/or visual signal transmitted by the elected vehicle $V_8$. Referring to FIG. 2, the processing unit $10_8$ of the embedded equipment $EQ_{VE8}$, can temporarily activate, for example for a few seconds, a horn $14_8$ and/or hazard or low beam lights $15_8$ of the elected vehicle $V_8$. The user U can thus very simply and very quickly identify the elected vehicle $V_8$ from among all the other vehicles $V_1$-$V_{13}$.

The location information can also consist of information about the location of the elected vehicle $V_8$ in the car park P (space number, floor, etc.). To do this, and as illustrated in FIG. 1, each parking space is advantageously fitted with a presence sensor C. This sensor C can be an inductive sensor (e.g. with an inductive loop), a capacitive sensor, a magnetic presence sensor (e.g. magnetometer), an ultrasonic presence sensor, or other sensor, integrated in the floor covering of the space. This sensor C stores the number, and possibly the floor, of the parking space. In FIG. 2, the embedded equipment $EQ_{VE8}$ integrates or is connected to a reader $13_8$ adapted to communicate with the sensor C and find this parking space number and possibly the floor. This information is thus transmitted to the user equipment $EQ_U$, for example, at the same time as the identification data $ID_{VE8}$. Knowing the exact position of the elected vehicle $V_8$ in the car park P, the user U can find it very easily.

The step of identifying the elected vehicle $V_8$, according to the embodiments described above, can be executed following the election of the vehicle $V_8$, or following the receipt of the access authorisation $ID_{ACCES}$.

After having identified the elected vehicle $V_8$, the user U transmits (step TRANS_$ID_{ACCES}$), from their equipment $EQ_U$, an access authorisation $ID_{ACCES}$ to the $EQ_{VE8}$ equipment of said vehicle. With the user U now having all the information to identify the elected vehicle $V_8$, it is very easy to find it. Also, the authorisation access $ID_{ACCES}$ is preferably transmitted directly to the equipment $EQ_{VE8}$. However, indirect transmission via the equipment $EQ_{VE10}$ can be provided if the latter is the master equipment. It is that which thus transmits the authorisation access $ID_{ACCES}$ to the equipment $EQ_{VE8}$.

The transmission TRANS_$ID_{ACCES}$ is preferably done through the above-mentioned connection $L_{CP1}$. A transmission via another short-range wireless connection using another, more secure communication protocol can however be considered.

The access authorisation $ID_{ACCES}$ preferably integrates the user ID and/or the user equipment $EQ_U$ ID and/or a secret shared with the target vehicles $V_4$, $V_8$, $V_{10}$ and $V_{11}$. This secret can in particular be transmitted to the user equipment $EQ_U$, by the above-mentioned remote server, at the time of registration of the user U, and stored in the memory 22. This secret is also stored in the memory of the embedded equipment of the target vehicles $V_4$, $V_8$, $V_{10}$ and $V_{11}$.

A user can be registered with the remote server, but blacklisted or registered on a list of unwanted users. This is the case, for example, when this user has not paid for their subscription to the service or has not paid for previous use of a shared vehicle. This unwanted user must not be able to access the target vehicles. The remote server knows that this user is blacklisted (via an update of its database). However, under the conditions of the invention, the equipment $EQ_{VE8}$ of the elected vehicle $V_8$ does not necessarily know this. Indeed, being off-network, the remote server cannot be interrogated to verify the user's access rights to the service. To overcome this, it is preferred that, as soon as a vehicle finds the network, its embedded equipment connects to the remote server to automatically recover a blacklist of user IDs and/or user equipment $EQ_U$ IDs associated with blacklisted users. This blacklist is thus stored in the memory of each piece of embedded equipment. It is thus ensured that this blacklist is regularly updated.

Also, after having received the access authorisation $ID_{ACCES}$, and to authorise access to the elected vehicle $V_8$, the method can comprise a prior step of verifying the user ID and/or the user equipment $EQ_U$ ID to ensure that these IDs are not stored in the blacklist. This verification step is performed by the equipment $EQ_{VE8}$ of the elected vehicle $V_8$ or by the master equipment (e.g. the equipment $EQ_{VE10}$).

Following reception of the access authorisation $ID_{ACCES}$ (and, if necessary, following the above-mentioned verification step), the equipment $EQ_{VE8}$ of the elected vehicle $V_8$ activates access to said vehicle (step ACTIV) and in particular, its opening or its unlocking. The user U can thus enter the passenger compartment of the elected vehicle $V_8$, start it and use it normally.

As soon as the vehicle $V_8$ finds the data network, it transmits to the remote server, data stored in its memory such as: the unique ID of the vehicle, the ID of the user U and/or their equipment $EQ_U$, an indication of its status (e.g. "occupied—unavailable for reservation"), as well as all other data generally transmitted by a telematic box (GPS position, speed, etc.).

FIG. 3b illustrates an alternative embodiment of the first embodiment. The election process ELECT comprises an intermediate step of developing a selectable list LISTE, wherein vehicles $V_8$ and $V_{10}$ are ranked in descending order (or alternatively, in ascending order) of fuel and/or charge level. Using the above example, the vehicle $V_8$ is ranked first and the vehicle $V_{10}$ second.

Each vehicle of the list is preferably associated with a unique ID (e.g. a unique numeric or alphanumeric code assigned to each vehicle and stored in the memory of the latter), an indication of its model and of its colour and/or its image or photo.

This list is transmitted to the user equipment $EQ_U$ (step TRANS_LIST), from the equipment $EQ_{VE8}$ of the vehicle $V_8$ ranked first, or from the master equipment (which can be the equipment $EQ_{VE8}$ or the equipment $EQ_{VE10}$). This transmission is done via the connection $L_{CP1}$ or via another more secure connection.

The user U selects (SELECT), from their user equipment $EQ_U$, a vehicle from among the vehicles of the list. In the example of FIG. 3b, the vehicle $V_8$ is selected by the user U (but, this could be the other vehicle $V_{10}$, if its model is more suitable for them).

The choice of the user U is transmitted (step TRANS_CHOIX) from their equipment $EQ_U$, either directly to the equipment $EQ_{VE8}$ of the selected vehicle $V_8$, or indirectly, via the equipment $EQ_{VE10}$, in the case where this is the master equipment. The data transmitted comprise, in particular, the unique ID of the selected vehicle $V_8$. This transmission is done via the connection $L_{CP1}$ or via another more secure connection.

As soon as the user's choice is received by the embedded equipment $EQ_{VE8}$ and/or $EQ_{VE10}$ in charge of implementing the election process ELECT, said process is completed by the election of the vehicle $V_8$ selected by the user.

Second Embodiment

In the first embodiment which has just been described and given as an example, the user only has potential access to the two target vehicles $V_8$ and $V_{10}$ of which the transmitting/receiving zones $Z_{V8}$, $Z_{V10}$ overlap with the transmitting/receiving zone $Z_U$ of the user equipment $EQ_U$. With the zones $Z_{V4}$ and $Z_{V11}$ not overlapping with the zone $Z_U$, the embedded equipment, $EQ_{VE4}$, $EQ_{VE11}$ do not directly receive the activation signal TRANS_SIGN, such that the vehicles $V_4$ and $V_{11}$ do not participate in the election process. It can however be advantageous for a greater number of vehicles to participate there, this would only be to propose a wider choice of vehicles to the user U.

In FIG. 1, the transmitting/receiving zone $Z_U$ overlaps with the transmitting/receiving zones $Z_{V8}$ and $Z_{V10}$. but not with the transmitting/receiving zones $Z_{V4}$ and $Z_{V11}$. However, the transmitting/receiving zone $Z_{V10}$ overlaps with the transmitting/receiving zone $Z_{V11}$. Also, the transmitting/receiving zone $Z_{V11}$ overlaps with the transmitting/receiving zone $Z_{V4}$. As a result:

the embedded equipment $EQ_{VE8}$ and $EQ_{VE10}$ can directly communicate and exchange data with the user equipment $EQ_U$;

the embedded equipment $EQ_{VE10}$ and $EQ_{VE11}$ can directly communicate and exchange data with each other;

the embedded equipment $EQ_{VE11}$ and $EQ_{VE4}$ can directly communicate and exchange data with each other;

The embedded equipment $EQ_{VE4}$, $EQ_{VE8}$, $EQ_{VE10}$, $EQ_{VE11}$ is thus arranged as a wireless mesh network. Indeed, all the transmitting/receiving zones $Z_{V4}$, $Z_{V8}$, $Z_{V10}$ and $Z_{V1}$ are juxtaposed, with each piece of embedded equipment being able to communicate with the other piece(s) of embedded equipment of the network which are located in their own transmitting/receiving zone. For example, the embedded equipment $EQ_{VE4}$ communicates only with the embedded equipment $EQ_{VE11}$, while the latter can communicate, not only with the embedded equipment $EQ_{VE4}$, but also with the embedded equipment $EQ_{VE10}$. As an example, the number of vehicles participating in the network is between 2 and 50.

Thus, and by referring to FIG. 4a, the activation signal is transmitted (step TRANS_SIGN) from the user equipment $EQ_U$ to the embedded equipment $EQ_{VE8}$ and $EQ_{VE10}$ via the connection $L_{CP1}$. Upon reception of the activation signal, the embedded equipment $EQ_{VE10}$ retransmits (via the connection $L_{CP2}$) said signal to the embedded equipment $EQ_{VE11}$ (step TRANS_SIGN'). Also, upon reception of the activation signal, the embedded equipment $EQ_{VE11}$ retransmits (via the connection $L_{CP2}$) said signal to the embedded equipment $EQ_{VE4}$ (step TRANS_SIGN"). The activation signal is therefore received by all the embedded equipment of the target vehicles. Of course, the signal retransmitted by a piece of embedded equipment can be received simultaneously by several other pieces of embedded equipment, if their respective transmitting/receiving zones overlap.

According to an embodiment, the embedded equipment $EQ_{VE4}$, $EQ_{VE8}$, $EQ_{VE10}$, $EQ_{VE11}$ only retransmit the activation signal once. This prevents the activation signal from being retransmitted indefinitely. For example, when the embedded equipment $EQ_{VE10}$ receives the activation signal in the step TRANS_SIGN, and retransmits it in the step TRANS_SIGN', these events are saved in its memory. When the embedded equipment $EQ_{VE11}$ retransmits the activation signal in the step TRANS_SIGN", said signal is again received by the embedded equipment $EQ_{VE10}$. This observing that it has already received and transmitted the activation signal, and will not retransmit it again.

Upon reception of the activation signal, all the embedded equipment $EQ_{VE4}$, $EQ_{VE8}$, $EQ_{VE10}$, $EQ_{VE11}$ will participate in the implementation of the election process ELECT. This is similar to the election process described above, with reference to the first embodiment. In particular, the embedded equipment will exchange information (e.g. respective fuel and/or charge level, intensity of the activation signal received, etc.) during the step ECH. Information is communicated, step-by-step, through the wireless mesh network. The election process ELECT can be implemented in one single piece of embedded equipment (e.g. in $EQ_{VE8}$) or simultaneously in all the embedded equipment. One of the pieces of embedded equipment can be a master, the others being slaves.

The steps of identifying the elected vehicle, transmitting the access authorisation $TRANS\_ID_{ACCES}$ and activating ACTIV the access to said elected vehicle, are similar to those described above with reference to the first embodiment.

FIG. 4b illustrates an alternative embodiment of the second embodiment. The election process ELECT comprises an intermediate step of developing a selectable list LISTE, wherein all the vehicles $V_4$, $V_8$, $V_{10}$ and $V_{11}$ are ranked in descending order of fuel and/or charge level. This list is therefore more extensive than that described with reference to FIG. 3a, and offers more choices to the user U. This step of developing the list, as well as the other steps of transmitting TRANS_LISTE, of selecting a vehicle SELECT, and of transmitting the user's choice TRANS_CHOIX, are similar to those described with reference to FIG. 3a.

Third Embodiment

In the first and second embodiments, the election process ELECT is implemented in one or more of the pieces of embedded equipment $EQ_{VE4}$, $EQ_{VE8}$ $EQ_{VE10}$, $EQ_{VE11}$. In this third embodiment, the election process ELECT is implemented in the user equipment $EQ_U$.

By referring to FIG. 5, from the information exchange step ECH, the exchanged information (e.g. respective fuel and/or charge level, received activation signal strength, etc.) is transmitted (step TRANS_DONNEES) to the user equipment $EQ_U$. The information provided by a vehicle is preferably associated with the unique ID of said vehicle. This transmission is done from one of the pieces of embedded equipment, for example from the equipment $EQ_{VE8}$ having received the activation signal with the highest intensity or from another piece of equipment considered as master. This transmission is done via the connection $L_{CP1}$ or via another more secure connection.

As soon as the user equipment $EQ_U$ receives this information, it analyses it to elect one of the target vehicles. As described above, this election can be based on the fuel or charge level of the vehicles, on the strength of the activation signal received, or following a selection of the vehicle in the list of target vehicles developed by the user equipment $EQ_U$.

After having elected the vehicle (e.g. vehicle $V_8$), the user U sends, from their equipment $EQ_U$, a request for identification of said vehicle (step REQ). As for the activation signal, this request is transmitted directly to the embedded equipment $EQ_{VE8}$ and $EQ_{VE10}$, then, step-by-step, to the embedded equipment $EQ_{VE11}$ and $EQ_{VE4}$ (steps REQ' and REQ"). This transmission is done via the connection $L_{CP2}$.

The identification request contains the unique ID of the elected vehicle. Upon reception of the request, the embedded equipment $EQ_{VE8}$ of the elected vehicle $V_8$ recognises its unique ID and identifies itself to the user U. This identification step is similar to that described above with reference to the first and second embodiments.

System

According to another aspect, the invention relates in particular to a system comprising the user equipment $EQ_U$ and at least one of the pieces of embedded equipment $EQ_{VE4}$, $EQ_{VE8}$, $EQ_{VE10}$, $EQ_{VE11}$, configured to implement the method according to the invention.

Computer Program Product

According also to another aspect, the invention relates to a computer program product comprising code instructions for the execution of the method according to the invention, when it is executed by at least one of the pieces of embedded equipment $EQ_{VE4}$, $EQ_{VE8}$, $EQ_{VE10}$ and/or $EQ_{VE11}$.

The arrangement of the different elements and/or means and/or steps of the invention, in the preferred embodiments described above, must not be understood as requiring such an arrangement in all implementations. In particular, one or more characteristics and/or steps disclosed only in one embodiment can be generalised to the other embodiments.

Likewise, one or more characteristics and/or steps disclosed only in one embodiment can be combined with one or more other characteristics and/or steps disclosed only in another embodiment

The invention claimed is:

1. A method for activating access to a vehicle within a vehicle fleet parked in a parking area not covered by a data network, comprising:
transmitting an activation signal from a piece of computer equipment of a user, which transmission is done via a short-range wireless connection in the parking area,
receiving the activation signal by embedded computer equipment from a plurality of vehicles of the vehicle fleet,
implementing a computerized logic process leading to the election of at least one vehicle from among the plurality of vehicles,
wherein the process is based:
on an analysis of the available fuel level and/or the electrical charging level of the vehicles of the plurality of vehicles, or
on an analysis of the intensity with which the embedded computer equipment has received the activation signal, identification of the elected vehicle:
by transmitting, from the elected vehicle, location information of said vehicle, and/or
by transmitting one or more pieces of identification data of the elected vehicle to the user equipment, from the embedded equipment of a vehicle from one of the plurality of vehicles, which transmission is done via a short-range wireless connection in the parking area,
transmission of an access authorization to the embedded equipment of the elected vehicle, from the user equipment, which transmission is done via a short-range wireless connection in the parking area,
activation of access to the elected vehicle following the reception of the access authorization by the embedded equipment of said vehicle.

2. The method according to claim 1, wherein the location information comprises at least one of an audible and/or visual signal transmitted by the elected vehicle.

3. The method according to claim 1, wherein the location information comprises information on the location of the elected vehicle in the parking area.

4. The method according to claim 1, further comprising:
receiving the activation signal by the computer equipment of a first vehicle of the plurality of vehicles,
transmitting the activation signal from the computer equipment of the first vehicle to at least the computer equipment of a second vehicle of the plurality of vehicles, and
transmitting the activation signal from the computer equipment of the second vehicle to at least the computer equipment of a third vehicle of the plurality of vehicles,
wherein the signal transmission between the first vehicle, the second vehicle and third vehicle is done via a short-range wireless connection in the parking area.

5. The method according to claim 1, further comprising arranging the embedded equipment in the form of a wireless mesh network.

6. The method according to claim 1, wherein the computerized election logic process comprises:
developing a selectable list, wherein the vehicles of the plurality of vehicles are ranked in descending order of fuel and/or charge level, each vehicle of the list being associated with a unique ID,
transmitting the list to the user equipment, from the embedded equipment of a vehicle of the plurality of vehicles, which transmission is done via a short-range wireless connection in the parking area,
selecting, from the user equipment, of a vehicle from among the vehicles of the list,
transmitting the unique ID of the selected vehicle, to the embedded equipment, of a vehicle of the plurality of vehicles, from the user equipment, which transmission is done via a short-range wireless connection in the parking area,
completing the selection process by electing the selected vehicle.

7. The method according to claim 1, further comprising:
storing, in a memory of each piece of embedded equipment of the vehicles of the plurality of vehicles, of a list of user IDs and/or user equipment IDs associated with unwanted users,
integrating, in the access authorization, a user ID and/or a user equipment ID,
for activating access to the elected vehicle, prior verification by the embedded equipment of said vehicle, that the user ID and/or the user equipment ID are not registered in said list.

8. The method according to claim 1, further comprising integrating an ID in the activation signal, which ID is adapted to trigger the computerized election logic process.

9. The method according to claim 1, wherein the short-range wireless connection uses a communication protocol from the following family: Bluetooth, Wi-Fi, Z-Wave, ANT, ZIGBEE, Infrared.

10. A system comprising at least one piece of equipment of a user and at least one piece of embedded computer equipment of a vehicle, for implementing the method of claim 1.

11. A computer program product embodied on a non-transitory computer-readable storage medium, and comprising code instructions for executing a method according to claim 1, wherein the method is executed by at least one piece of embedded computer equipment of a vehicle.

* * * * *